(12) United States Patent
Hasegawa et al.

(10) Patent No.: US 7,039,374 B2
(45) Date of Patent: May 2, 2006

(54) TRANSMITTING AND AMPLIFYING UNIT FOR WIRELESS COMMUNICATION DEVICE

(75) Inventors: Yuuji Hasegawa, Kawasaki (JP); Kazuo Hirafuji, Kawasaki (JP); Toshimitsu Kobayashi, Kawasaki (JP); Manabu Miyamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1088 days.

(21) Appl. No.: 09/952,190

(22) Filed: Sep. 14, 2001

(65) Prior Publication Data

US 2002/0160742 A1    Oct. 31, 2002

(30) Foreign Application Priority Data

Apr. 25, 2001    (JP)    ............................. 2001-127608

(51) Int. Cl.
    *H04B 1/034*    (2006.01)

(52) U.S. Cl. .................... 455/128; 455/90.3; 361/695; 361/715; 361/734; 361/714; 379/326; 379/327; 379/328

(58) Field of Classification Search ................ 455/128, 455/90.3; 361/695, 715, 734, 714; 379/326–328
See application file for complete search history.

(56) References Cited

U.S. PATENT DOCUMENTS

| | | | | |
|---|---|---|---|---|
| 6,144,556 A | * | 11/2000 | Lanclos | ...................... 361/695 |
| 6,349,042 B1 | * | 2/2002 | Mills et al. | ................. 361/818 |
| 6,494,252 B1 | * | 12/2002 | Takala et al. | .......... 165/104.33 |
| 6,853,553 B1 | * | 2/2005 | Seaton et al. | ............... 361/695 |

* cited by examiner

*Primary Examiner*—Fan Tsang
*Assistant Examiner*—Aung T. Win
(74) *Attorney, Agent, or Firm*—Katten Muchin Rosenman LLP

(57) ABSTRACT

A transmitting and amplifying unit for a wireless communication device. The transmitting and amplifying unit includes a C-shaped frame having an upper plate having a first cutout, a lower plate having a second cutout aligned with the first cutout, and a side plate connecting the upper plate and the lower plate; a main amplifier unit fixed to the lower plate and having a concentrated heating portion; and a subamplifier unit fixed to the upper plate. The transmitting and amplifying unit further includes a radiating fin unit mounted on the concentrated heating portion of the main amplifier unit and extending upward through the first cutout of the lower plate and the second cutout of the upper plate. The radiating fin unit has an upper end fixed to the subamplifier unit. The transmitting and amplifying unit further includes a cooling fan fixed to the C-shaped frame, and a printed wiring board mounted on the C-shaped frame so as to face the side plate, whereby a duct is formed between the C-shaped frame and the printed wiring board.

6 Claims, 11 Drawing Sheets

TRANSMITTING AND AMPLIFYING UNIT FOR WIRELESS COMMUNICATION DEVICE

BACKGROUND OF THE INVENTION

1. Field of the Invention

The present invention relates to a transmitting and amplifying unit for a wireless communication device.

2. Description of the Related Art

In recent years, a wireless communication device for a mobile base station has been required to have a compact size, high output, and high reliability. The wireless communication device includes a transmitting and amplifying unit, a receiving unit, and a control unit. These units are mounted on a rack. In the transmitting and amplifying unit of the wireless communication device, many heating components such as power transistors are included especially in an amplifying portion of a microwave circuit. Accordingly, the transmitting and amplifying unit is required to have a radiating structure for efficiently radiating heat from these heating components.

Natural air cooling is adopted for radiation of heat from a transmitting device having a relatively small transmission output. However, in the case of a large transmission output as in a recent communication device, a large quantity of heat is generated and radiation by natural convection is therefore insufficient, so that a radiating structure employing forced air cooling becomes necessary. In general, a cooling fan and radiating fins are used for the radiation by forced air cooling. In the case of forced air cooling, a spacing between the radiating fins can be reduced as compared with the case of natural air cooling, and a sufficient radiating area can therefore be ensured. However, there is no difference in coefficient of heat transfer between forced air cooling and natural air cooling with the same material. Accordingly, although a large radiating area can be ensured in the case of forced air cooling, heat is radiated before it is transmitted over the radiating area. Thus, there is a limit to heat transfer, and the cooling is accordingly limited. As means for efficiently performing heat transfer, a heat pipe effective for heat transfer is known. However, the heat pipe loses a mounting density, so that it does not contribute to size reduction.

A known transmitting and amplifying unit includes a frame, a main amplifier unit mounted on the frame, a subamplifier unit mounted on the frame, a first radiating fin unit mounted on a heating portion of the main amplifier unit, a second radiating fin unit mounted on a heating portion of the subamplifier unit, and a cooling fan mounted at the rear end of the frame for forcibly air-cooling these heating portions. This conventional transmitting and amplifying unit has a plurality of printed wiring boards and a plurality of radiating fins, resulting in large weight and relatively complex structure. In the conventional transmitting and amplifying unit, each radiating fin has a large size, causing an increase in total weight of the transmitting and amplifying unit, thus hindering weight reduction.

To obtain an optimum radiation efficiency, a concentrated heating portion existing in the main amplifier unit must be efficiently cooled. However, there is a limit to the mounting portions of components due to the fact that electrical characteristics must be ensured. As a result, the conventional transmitting and amplifying unit does not have a radiating structure capable of efficiently cooling the concentrated heating portion. For example, each radiating fin is long in the longitudinal direction of the transmitting and amplifying unit, causing a large pressure loss. Further, the mounting position of the cooling fan is limited. Accordingly, cooling air drawn by the cooling fan cannot be mainly directed to the concentrated heating portion, and the radiation cannot be efficiently performed. Moreover, the conventional transmitting and amplifying unit employs many printed wiring boards and many connection cables for connecting the printed wiring boards. Further, the number of parts is large. As a result, the number of man-hours for assembly becomes large, causing a cost increase.

SUMMARY OF THE INVENTION

It is therefore an object of the present invention to provide a transmitting and amplifying unit for a wireless communication device which can relatively reduce the number of parts, reduce the weight, and improve the radiation efficiency.

In accordance with an aspect of the present invention, there is provided a transmitting and amplifying unit for a wireless communication device, comprising a C-shaped frame having an upper plate, a lower plate having a first cutout, and a side plate connecting said upper plate and said lower plate; a main amplifier unit fixed to said lower plate and having a concentrated heating portion; a first radiating fin unit mounted on said concentrated heating portion of said main amplifier unit and extending upward through said first cutout of said lower plate; and a cooling fan fixed to said C-shaped frame.

Preferably, the transmitting and amplifying unit further comprises a first printed wiring board mounted on the C-shaped frame so as to face the side plate. The C-shaped frame and the first printed wiring board form a duct as an air passage for passing the air drawn by the cooling fan. Preferably, the transmitting and amplifying unit further comprises a subamplifier unit fixed to the upper plate of the C-shaped frame. The upper plate of the C-shaped frame has a second cutout aligned with the first cutout of the lower plate. The first radiating fin unit extends upward through the second cutout of the upper plate, and the upper end of the first radiating fin unit is fixed to the subamplifier unit.

The main amplifier unit has a second printed wiring board and a plurality of feedthrough capacitors, and the subamplifier unit has a third printed wiring board and a plurality of feedthrough capacitors. The second printed wiring board is connected to the first printed wiring board by the plurality of feedthrough capacitors of the main amplifier unit, and the third printed wiring board is connected to the first printed wiring board by the plurality of feedthrough capacitors of the subamplifier unit. Preferably, the transmitting and amplifying unit further comprises a second radiating fin unit mounted on the main amplifier unit, and a third radiating fin unit mounted on the subamplifier unit. The lower plate of the C-shaped frame has a first opening, and the upper plate of the C-shaped frame has a second opening. The second radiating fin unit projects upward through the first opening of the lower plate, and the third radiating fin unit projects downward through the second opening of the upper plate.

In accordance with another aspect of the present invention, there is provided a transmitting and amplifying unit for a wireless communication device, comprising a C-shaped frame having an upper plate having a first cutout, a lower plate having a second cutout aligned with said first cutout, and a side plate connecting said upper plate and said lower plate; a main amplifier unit fixed to said lower plate and having a concentrated heating portion; a subamplifier unit fixed to said upper plate; a radiating fin unit mounted on said concentrated heating portion of said main amplifier unit and extending upward through said first cutout of said lower plate and said second cutout of said upper plate, said radiating fin unit having an upper end fixed to said subamplifier unit; a cooling fan fixed to said C-shaped frame; and a printed wiring board mounted on said C-shaped frame so as to face said side plate.

In accordance with a further aspect of the present invention, there is provided a wireless communication unit comprising a C-shaped frame having an upper plate, a lower plate, and a side plate connecting said upper plate and said lower plate; a first electronic circuit fixed to said lower plate; a second electronic circuit fixed to said upper plate; and a printed wiring board mounted on said C-shaped frame so as to face said side plate and electrically connected to said first electronic circuit and said second electronic circuit.

The first electronic circuit may be provided by a main amplifier unit, and the second electronic circuit may be provided by a subamplifier unit. The C-shaped frame and the printed wiring board form a duct.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
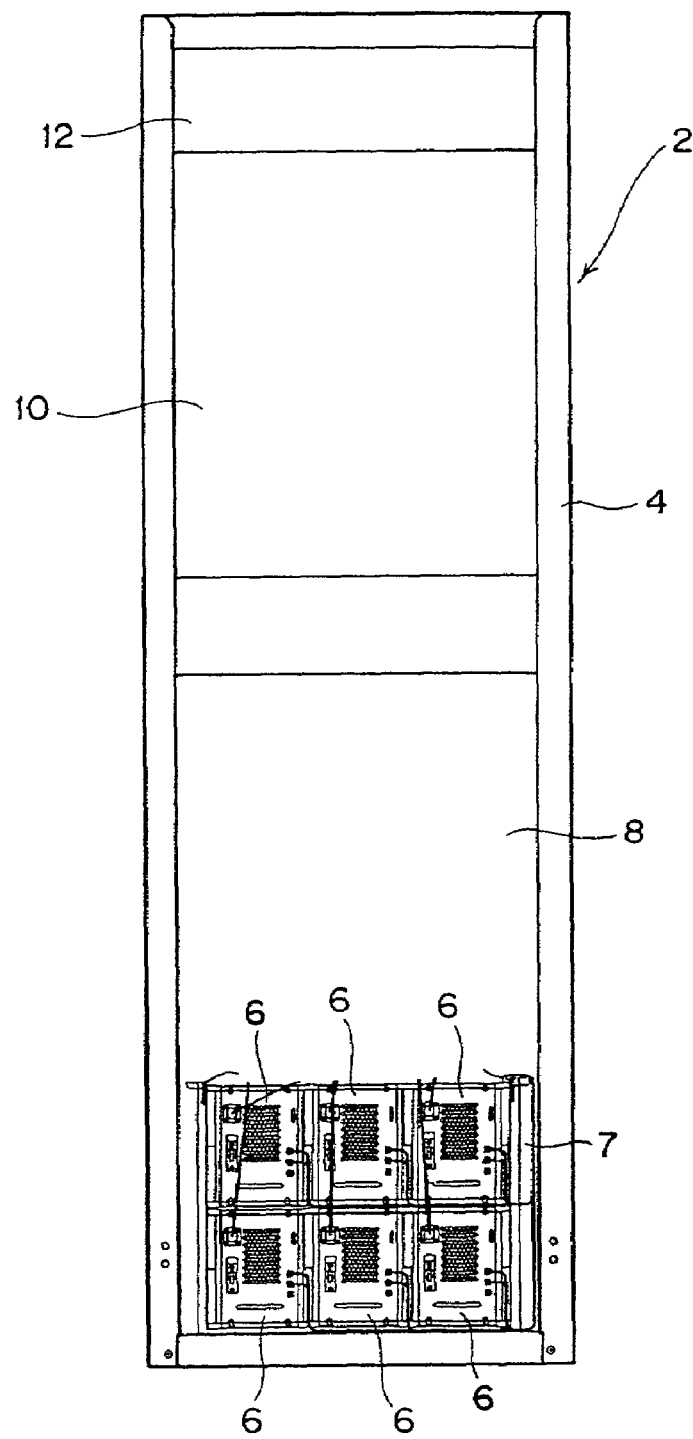
FIG. 1 is a schematic elevational view of a wireless communication device.

Referring to FIG. 1, there is shown a schematic elevational view of a wireless communication device 2. The wireless communication device 2 includes a transmitting and amplifying unit 6, a receiving unit 8, a control unit 10, and an interface unit 12. These units 6, 8, 10, and 12 are mounted on a vertically elongated rack 4. In this preferred embodiment, six transmitting and amplifying units 6 are mounted on a shelf 7. Each transmitting and amplifying unit 6 is guided by a guide (not shown) and mounted on the shelf 7. In this condition, the shelf 7 is mounted on the rack 4.

Figure 2:
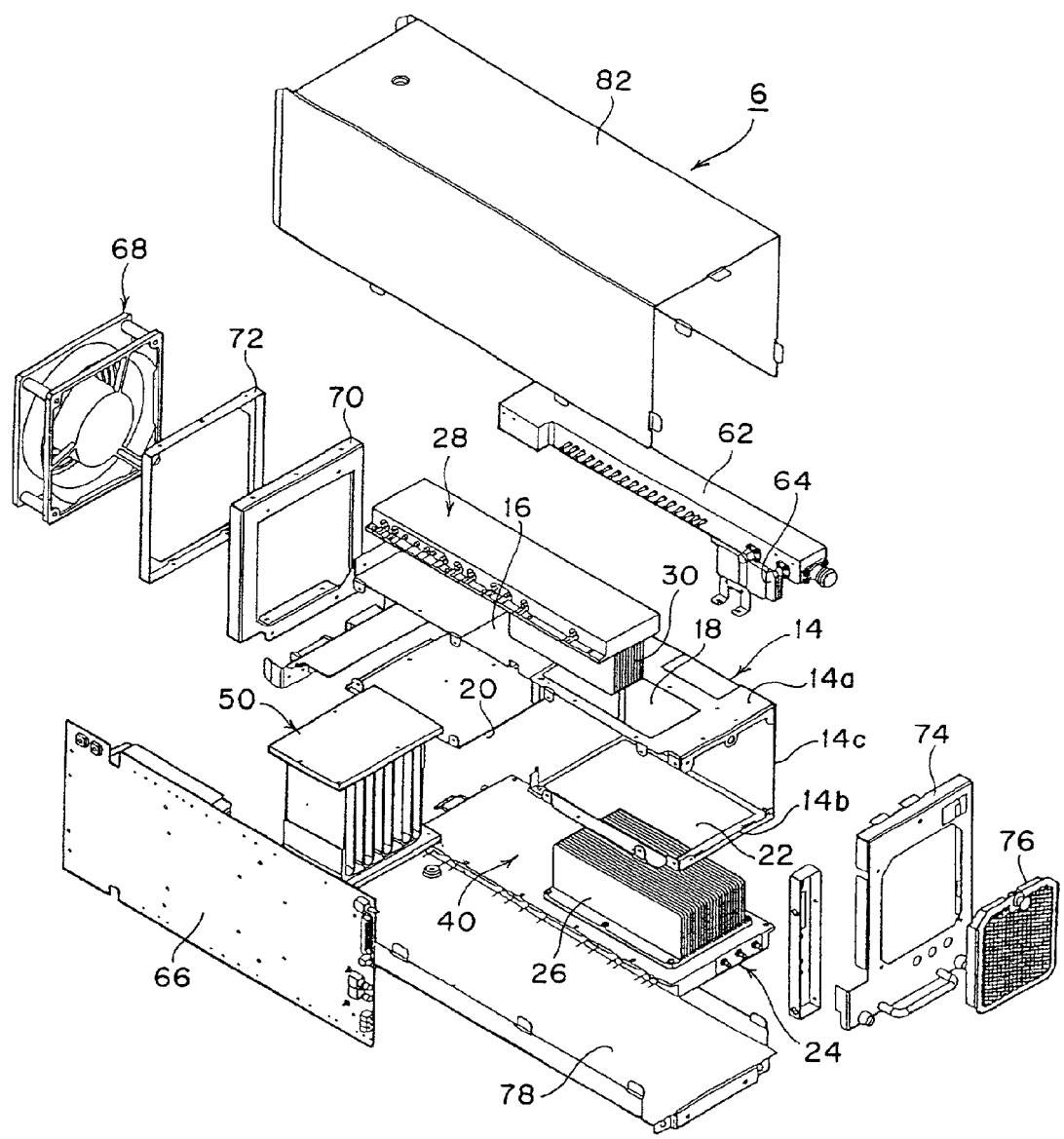
FIG. 2 is an exploded perspective view of a transmitting and amplifying unit according to a preferred embodiment of the present invention.
Figure 3:
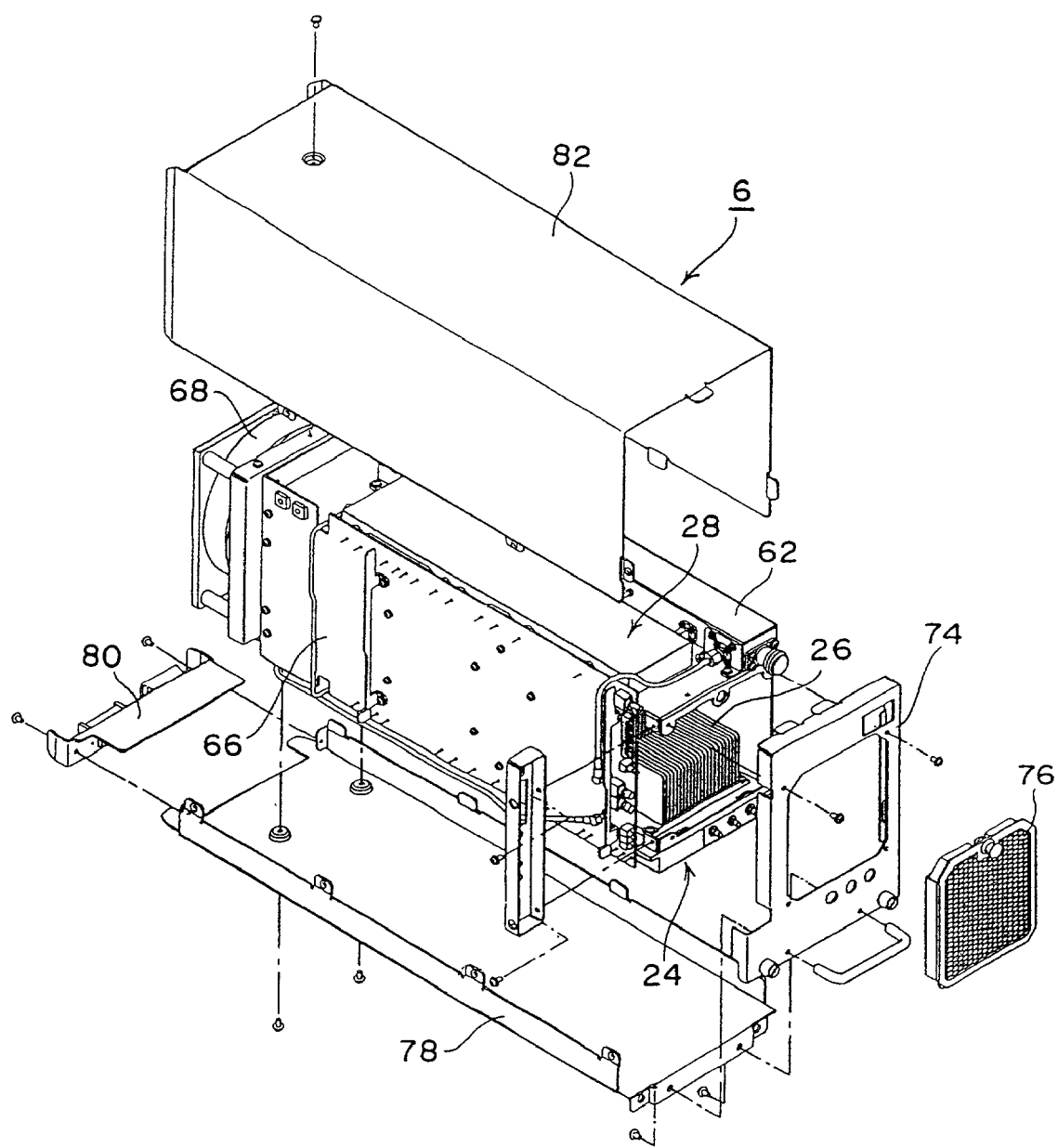
FIG. 3 is a perspective view of the transmitting and amplifying unit.
Figure 4:
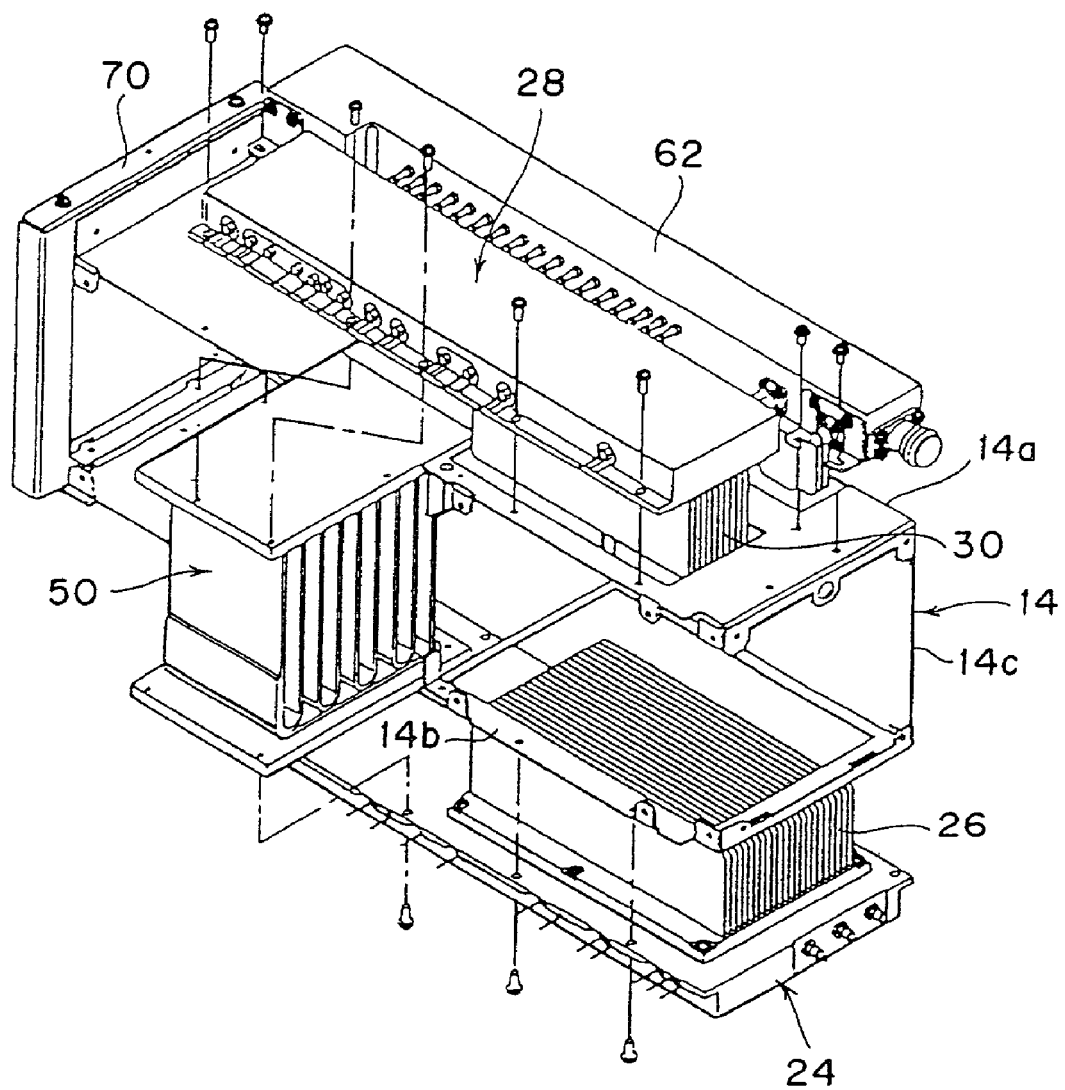
FIG. 4 is an exploded perspective view of an essential part of the transmitting and amplifying unit.

Referring to FIG. 2, there is shown an exploded perspective view of each transmitting and amplifying unit 6 shown in FIG. 1. FIG. 3 is a perspective view of the transmitting and amplifying unit 6 shown in FIG. 2, and FIG. 4 is an exploded perspective view of an essential part of the transmitting and amplifying unit 6 shown in FIG. 2. As best shown in FIG. 2, the transmitting and amplifying unit 6 includes a C-shaped frame 14 having an upper plate 14a, a lower plate 14b, and a side plate 14c connecting the upper plate 14a and the lower plate 14b. The C-shaped frame 14 is formed of steel, for example, and the upper plate 14a, the lower plate 14b, and the side plate 14c are integrated. The upper plate 14a has a cutout 16 and an opening 18. The lower plate 14b also has a cutout 20 and an opening 22. The cutout 16 of the upper plate 14a and the cutout 20 of the lower plate 14b are aligned with each other.

Figure 5A:
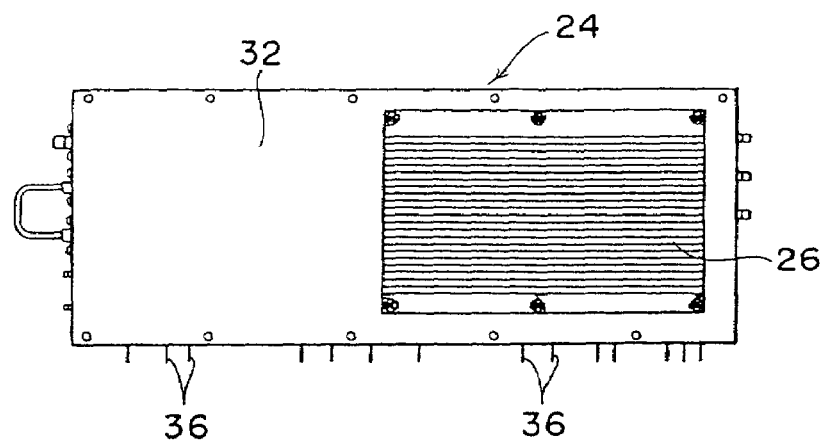
FIG. 5A is a top plan view of a main amplifier unit in the transmitting and amplifying unit.
Figure 5B:
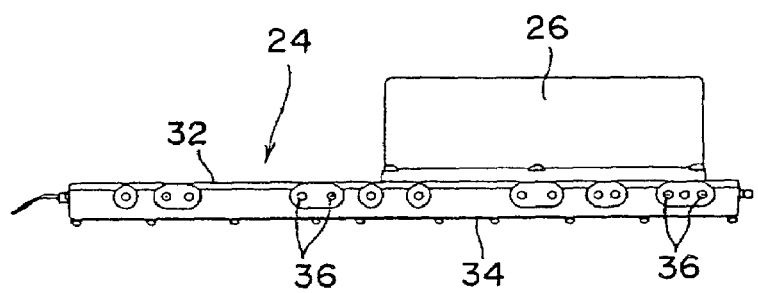
FIG. 5B is a side view of the main amplifier unit.
Figure 5C:
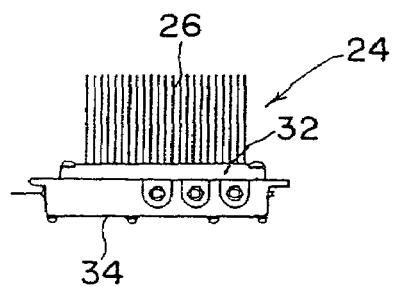
FIG. 5C is an elevational view of the main amplifier unit.

Reference numeral 24 denotes a main amplifier unit. A radiating fin unit 26 is mounted on the main amplifier unit 24. Referring to FIG. 5A, there is shown a top plan view of the main amplifier unit 24. FIG. 5B is a side view of the main amplifier unit 24, and FIG. 5C is an elevational view of the main amplifier unit 24. The main amplifier unit 24 has a housing 32 formed of a good heat conductor such as aluminum, and a cover 34 fixed to the housing 32. The cover 34 is also formed of a good heat conductor such as aluminum. The radiating fin unit 26 is mounted on the housing 32. A plurality of feedthrough capacitors 36 project from one side surface of the housing 32.

Figure 6:
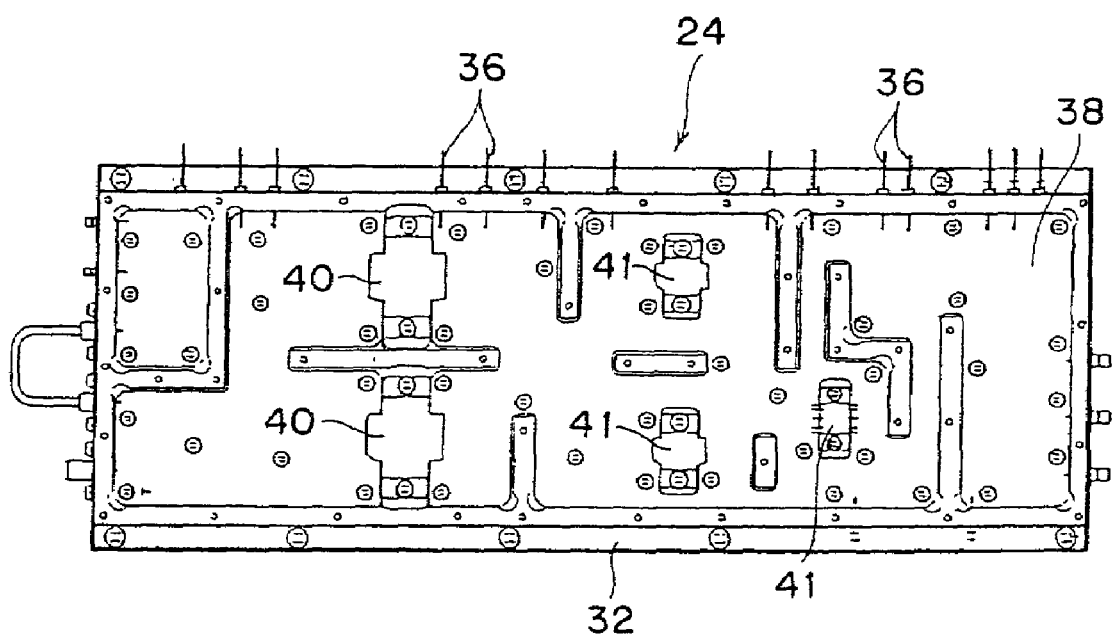
FIG. 6 is a bottom plan view of the main amplifier unit in the condition where a cover is removed.

FIG. 6 is a bottom plan view of the main amplifier unit 24 in the condition where the cover 34 is removed. A printed wiring board 38 is accommodated in the housing 32. Reference numeral 40 denotes a concentrated heating portion where a power transistor is mounted in the housing 32. Accordingly, when the main amplifier unit 24 is driven, temperature rises most near the concentrated heating portion 40. Reference numeral 41 denotes a heating portion where a power transistor is mounted in the housing 32. When the main amplifier unit 24 is driven, temperature rises also near the heating portion 41.

Referring again to FIG. 2, the radiating fin unit 26 is inserted into the opening 22 of the lower plate 14b of the C-shaped frame 14, and fixed to the lower plate 14b of the C-shaped frame 14. Reference numeral 28 denotes a subamplifier unit. A radiating fin unit 30 is mounted on the subamplifier unit 28. The subamplifier unit 28 is inserted into the opening 18 of the upper plate 14a of the C-shaped frame 14, and fixed to the upper plate 14a of the C-shaped frame 14.

Figure 7A:
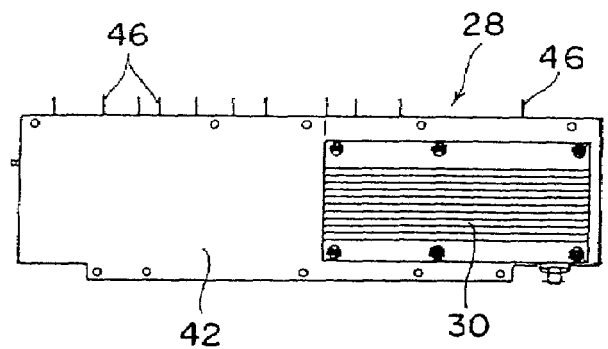
FIG. 7A is a bottom plan view of a subamplifier unit in the transmitting and amplifying unit.
Figure 7B:
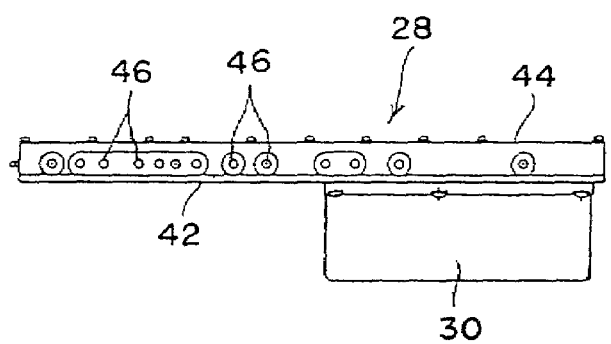
FIG. 7B is a side view of the subamplifier unit.
Figure 7C:
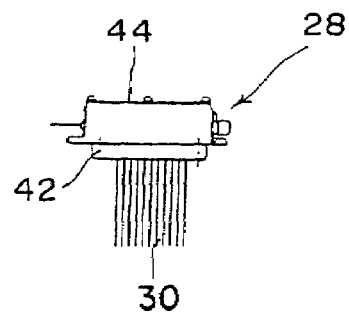
FIG. 7C is an elevational view of the subamplifier unit.

Referring to FIG. 7A, there is shown a bottom plan view of the subamplifier unit 28. FIG. 7B is a side view of the subamplifier unit 28, and FIG. 7C is an elevational view of the subamplifier unit 28. The subamplifier unit 28 has a housing 42 formed of a good heat conductor such as aluminum, and a cover 44 fixed to the housing 42. The cover 44 is also formed of a good heat conductor such as aluminum. The radiating fin unit 30 is mounted on the housing 42. A plurality of feedthrough capacitors 46 project from one side surface of the housing 42.

Figure 8:
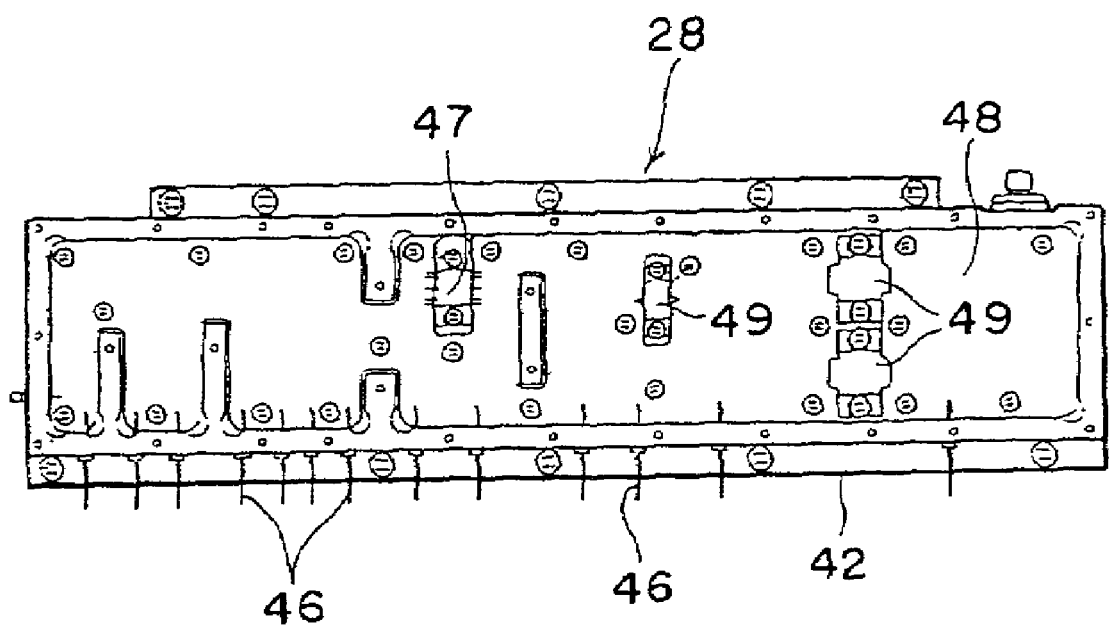
FIG. 8 is a top plan view of the subamplifier unit in the condition where a cover is removed.

Referring to FIG. 8, there is shown a top plan view of the subamplifier unit 28 in the condition where the cover 44 is removed. A printed wiring board 48 is accommodated in the housing 42 of the subamplifier unit 28. Reference numeral 47 denotes a first heating portion where a power transistor is mounted in the housing 42, and reference numeral 49 denotes a second heating portion where a power transistor is mounted in the housing 42.

The printed wiring board 38 of the main amplifier unit 24 and the printed wiring board 48 of the subamplifier unit 28 can be connected to a printed wiring board 66 having holes by inserting the feedthrough capacitors 36 and 46 into the holes of the printed wiring board 66. Accordingly, connection cables required in the prior art can be eliminated.

A radiating fin unit 50 is mounted on the concentrated heating portion 40 of the main amplifier unit 24. The radiating fin unit 50 extends upward through the cutout 20 of the lower plate 14b of the C-shaped frame 14 and the cutout 16 of the upper plate 14a of the C-shaped frame 14, and the upper end of the radiating fin unit 50 is fixed to the subamplifier unit 28 so as to come into close contact with a region including the first heating portion 47 of the subamplifier unit 28. To effect the close contact of the radiating fin unit 50 and the main amplifier unit 24 and the close contact of the radiating fin unit 50 and the subamplifier unit 28, the radiating fin unit 50 is first fixed to the main amplifier unit 24 and the subamplifier unit 28. Thereafter, the main amplifier unit 24 is fixed to the lower plate 14b of the C-shaped frame 14, and the subamplifier unit 28 is fixed to the upper plate 14a of the C-shaped frame 14.

Figure 9:
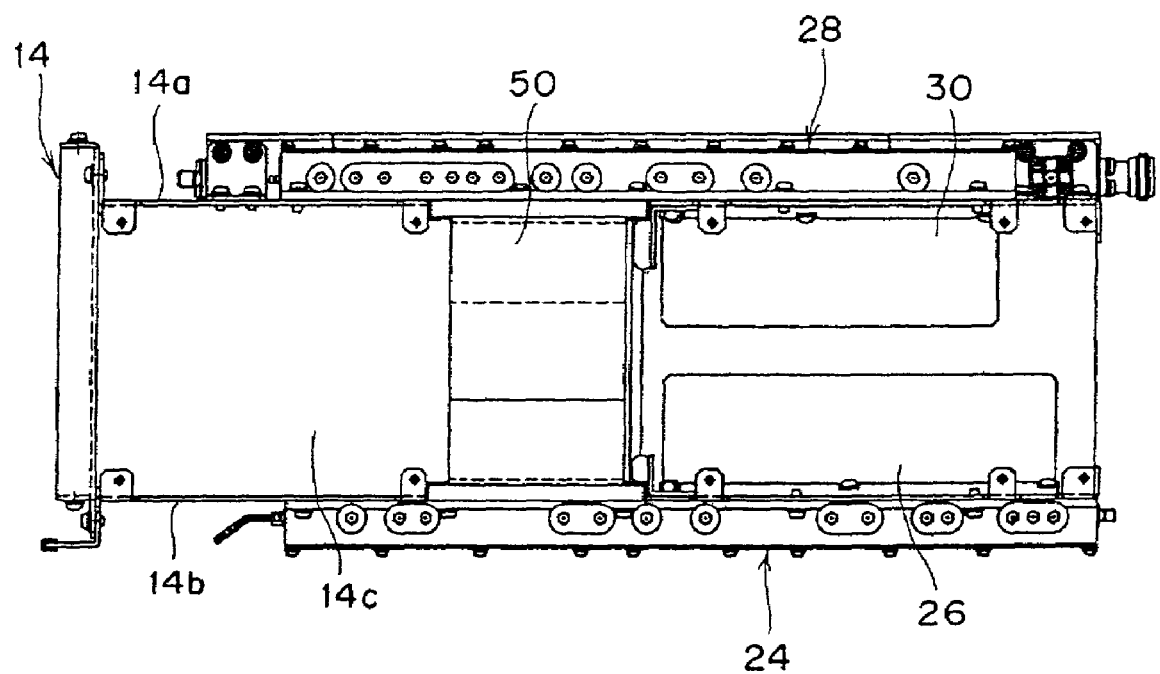
FIG. 9 is a side view of the essential part of the transmitting and amplifying unit.
Figure 10:
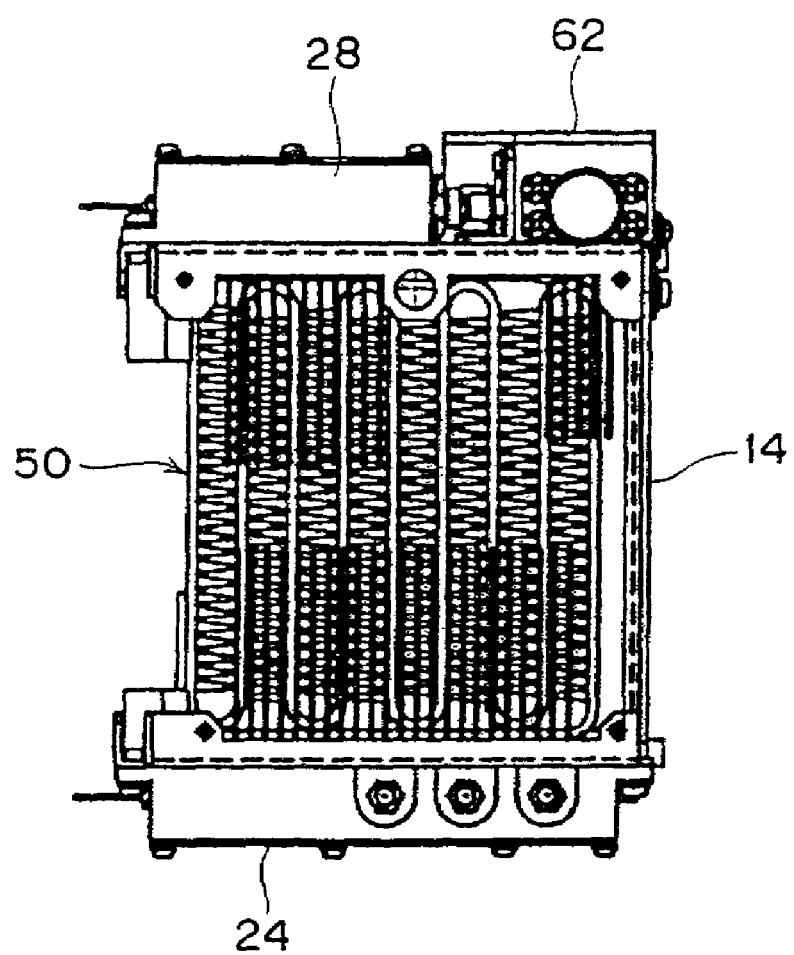
FIG. 10 is an elevational view of the essential part shown in FIG. 9 in the condition where second and third radiating fin units are removed.

Referring to FIG. 9, there is shown a side view of such an assembly obtained by fixing the main amplifier unit 24 to the lower plate 14b of the C-shaped frame 14 and fixing the subamplifier unit 28 to the upper plate 14a of the C-shaped frame 14. FIG. 10 is an elevational view of this assembly in the condition where the radiating fin units 26 and 30 are removed. The radiating fin unit 26 is mounted on the heating portion 41 of the main amplifier unit 24, and the radiating fin unit 30 is mounted on the second heating portion 49 of the subamplifier unit 28.

Figure 11A:
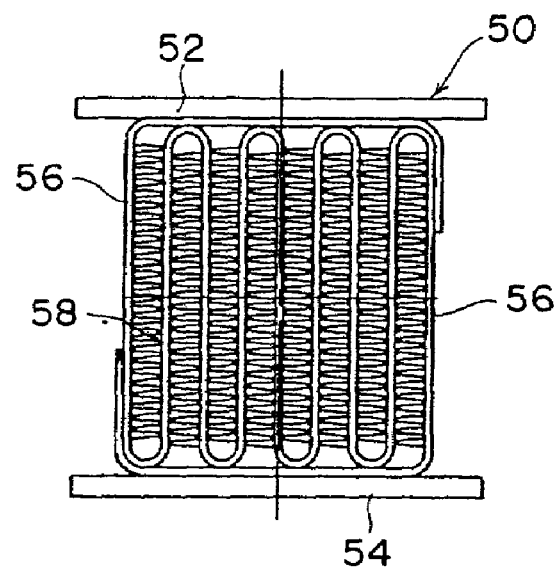
FIG. 11A is an elevational view of a first radiating fin unit in the transmitting and amplifying unit.
Figure 11B:
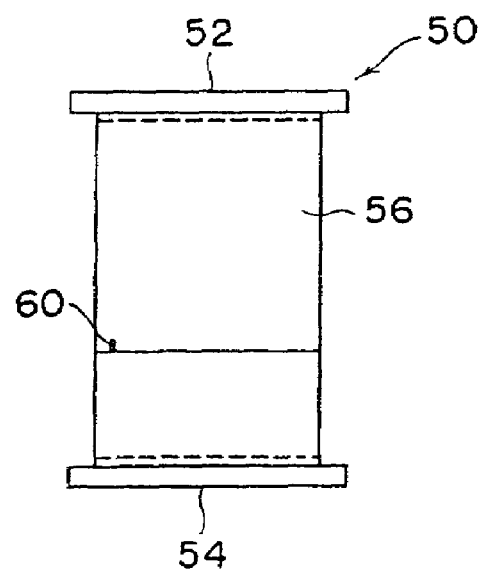
FIG. 11B is a left side view of FIG. 11A.
Figure 11C:
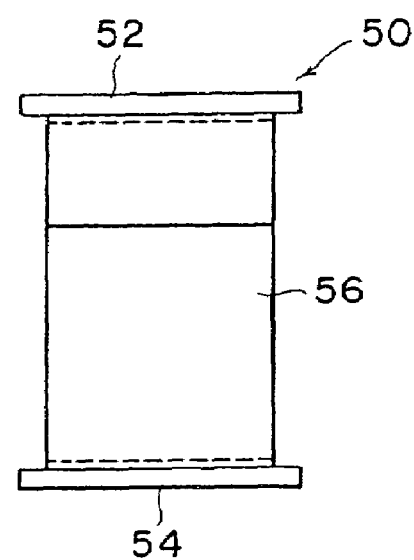
FIG. 11C is a right side view of FIG. 11A.

Referring to FIG. 11A, there is shown an elevational view of the radiating fin unit 50. FIG. 11B is a left side view of FIG. 11A, and FIG. 11C is a right side view of FIG. 11A. The radiating fin unit 50 includes an upper plate 52, a lower plate 54, a heat pipe 56, and numerous radiating fins 58. The radiating fins 58 are fixed to the heat pipe 56 by brazing or the like, and the heat pipe 56 is fixed to the upper plate 52 and the lower plate 54 by brazing or the like. All of the upper plate 52, the lower plate 54, the heat pipe 56, and the radiating fins 58 are formed of aluminum, for example. Reference numeral 60 shown in FIG. 11B denotes an inlet for injecting an operating fluid such as chlorofluoro carbon (CFC) into the heat pipe 56.

Referring again to FIGS. 2 and 3, a filter unit 62 is mounted on the upper plate 14a of the C-shaped frame 14 in adjacent relationship with the subamplifier unit 28. The filter unit 62 has a radiating fin 64. The filter unit 62 has a function of delaying the phase of a transmitted signal. As shown in FIG. 3, a printed wiring board 66 is fixed to the C-shaped frame 14 so as to face the side plate 14c. Accordingly, a box-shaped duct is formed by the C-shaped frame 14 and the printed wiring board 66.

A cooling fan 68 is fixed through frames 70 and 72 to the rear end of the C-shaped frame 14. A front plate 74 and an air filter 76 are fixed to the front end of the C-shaped frame 14. A bottom plate 78 and a cover 82 are fixed to the C-shaped frame 14. Reference numeral 80 denotes a connector metal fitting, and a power supply connector (not shown) is mounted on the connector metal fitting 80. The connector metal fitting 80 is inserted into the bottom plate 78 and fixed thereto with a cord connected to the power supply connector being accommodated in a space defined between the connector metal fitting 80 and the bottom plate 78.

In operation, when the transmitting and amplifying unit 6 is driven, the temperature of heating components such as power transistors in the main amplifier unit 24 and the subamplifier unit 28 rises. In particular, since a high-power power transistor is mounted at the concentrated heating portion 40 of the main amplifier unit 24, a temperature rise at the concentrated heating portion 40 is remarkable. The heat generated from the concentrated heating portion 40 of the main amplifier unit 24 and the heat generated from the first heating portion 47 of the subamplifier unit 28 are transported by the radiating fin unit 50 adopting the heat pipe 56, and efficiently radiated by driving the cooling fan 68.

Furthermore, since a box-shaped duct is formed by the C-shaped frame 14 and the printed wiring board 66, an air flow drawn through the air filter 76 by driving the cooling fan 68 is allowed to flow in this duct, thereby forcibly cooling the radiating fin unit 50, the radiating fin unit 26, the radiating fin unit 30, and the radiating fin 64. Accordingly, the main amplifier unit 24 and the subamplifier unit 28 can be efficiently cooled to a temperature of about 20° C. Further, by setting the sizes of the radiating fin unit 50, the radiating fin unit 26, and the radiating fin unit 30 to optimum sizes and mounting them at optimum positions according to the quantities of heat from the main amplifier unit 24 and the subamplifier unit 28, a reduction in weight of the whole radiating fins can be attained.

According to the present invention as described above, it is possible to provide a transmitting and amplifying unit for a wireless communication device which can be reduced in size and weight and can improve a radiation efficiency. Furthermore, the number of parts can be reduced to thereby reduce the number of man-hours for assembly, thus effecting a cost reduction in the transmitting and amplifying unit.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A transmitting and amplifying unit for a wireless communication device, comprising:
    a frame having an upper plate, a lower plate having a first cutout, and a side plate connecting said upper plate and said lower plate;
    a main amplifier unit fixed to said lower plate and having a concentrated heating portion;
    a first radiating fin unit mounted on said concentrated heating portion of said main amplifier unit and extending upward through said first cutout of said lower plate; and
    a cooling fan fixed to said frame.

2. A transmitting and amplifying unit for a wireless communication device, comprising:
    a C-shaped frame having an upper plate, a lower plate having a first cutout, and a side plate connecting said upper plate and said lower plate;
    a main amplifier unit fixed to said lower plate and having a concentrated heating portion;
    a first radiating fin unit mounted on said concentrated heating portion of said main amplifier unit and extending upward through said first cutout of said lower plate;
    a cooling fan fixed to said C-shaped frame;
    a first printed wiring board mounted on said C-shaped frame so as to face said side plate; and said C-shaped frame and said first printed wiring board mounted thereon forming a duct.

3. A transmitting and amplifying unit according to claim 2, further comprising a subamplifier unit fixed to said upper plate of said C-shaped frame;
    said upper plate of said C-shaped frame having a second cutout aligned with said first cutout of said lower plate;
    said first radiating fin unit extending upward through said second cutout of said upper plate and having an upper end fixed to said subamplifier unit.

4. A transmitting and amplifying unit according to claim 3, wherein:
    said main amplifier unit has a second printed wiring board and a plurality of feedthrough capacitors; and
    said subamplifier unit has a third printed wiring board and a plurality of feedthrough capacitors;
    said second printed wiring board being connected to said first printed wiring board by said plurality of feedthrough capacitors of said main amplifier unit;
    said third printed wiring board being connected to said first printed wiring board by said plurality of feedthrough capacitors of said subamplifier unit.

5. A transmitting and amplifying unit according to claim 3, further comprising a second radiating fin unit mounted on said main amplifier unit, and a third radiating fin unit mounted on said subamplifier unit;
    said lower plate of said C-shaped frame having a first opening;
    said upper plate of said C-shaped frame having a second opening;
    said second radiating fin unit extending upward through said first opening of said lower plate;
    said third radiating fin unit extending downward through said second opening of said upper plate.

6. A transmitting and amplifying unit for a wireless communication device, comprising:
    a C-shaped frame having an upper plate having a first cutout, a lower plate having a second cutout aligned with said first cutout, and a side plate connecting said upper plate and said lower plate;
    a main amplifier unit fixed to said lower plate and having a concentrated heating portion;
    a subamplifier unit fixed to said upper plate;
    a radiating fin unit mounted on said concentrated heating portion of said main amplifier unit and extending upward through said first cutout of said lower plate and said second cutout of said upper plate, said radiating fin unit having an upper end fixed to said subamplifier unit;
    a cooling fan fixed to said C-shaped frame; and
    a printed wiring board mounted on said C-shaped frame so as to face said side plate.

* * * * *